INVENTOR.
DAVID J. KLEE
James C. Simmons
ATTORNEY

United States Patent Office 3,613,386
Patented Oct. 19, 1971

3,613,386
CRYOGENIC FREEZER CONTROL
David J. Klee, Emmaus, Pa., assignor to Air Products and Chemicals, Inc., Allentown, Pa.
Filed Mar. 23, 1970, Ser. No. 21,625
Int. Cl. F25d *13/06*
U.S. Cl. 62—64         8 Claims

ABSTRACT OF THE DISCLOSURE

A method and apparatus for controlling the heat transfer characteritsics of a spray-type tunnel freezer by combining a signal generated by the temperature measured in the coldest gas recirculation zone of the tunnel with a signal generated by measuring the pressure of the cryogen at the spray header and comparing the combined signal with a known reference signal, a difference between the two signals causing a change in the flow rate of the cryogen. The invention is further characterized in that wide oscillations of recirculating gas temperature and cryogen flow are avoided.

BACKGROUND OF THE INVENTION

This invention pertains to controlling the heat transfer capability of a cryogen freezer such as disclosed in U.S. Pat. 3,403,527 owned by the assignee of the present invention. Food freezers, as shown by this patent, rely upon direct spraying of a liquid cryogen onto the article to be frozen as the last step in the operative freezing means. Such freezers also circulate the cold gas resulting from the vaporization of the liquid cryogen against the incoming product to effect continuous reduction of the temperature of the product being frozen. In freezers the rate of removal of heat, e.g., heat transfer, is affected by the temperature of the recirculating gas and the pressure of liquid sprayed upon the article to be frozen. Such freezers usually contain a plurality of discrete temperature zones so that the coldest gas recirculation zone and the spray zone generally provide approximately 65% of the total cooling capacity of the freezer. Therefore, a control based on the combined signals from the temperature of the coldest gas zone and pressure of liquid cryogen can effect control of the heat transfer capability of the freezer.

In order to control such freezers in the past, the available systems worked directly by temperature sensing means which in turn controlled the supply of liquid cryogen. These systems were inadequate because of the fact that the temperature in the spray zone does not vary with varying flow rate of cryogen. A control device sensing only the gas temperature is ineffective because of the delay inherent in waiting for the temperature change in the gas zone when the liquid cryogen flow rate was changed. Such a delay causes the control unit to oscillate about a set point resulting in wide variations in temperature and liquid cryogen flow rate.

SUMMARY OF THE INVENTION

The present invention provides a controhl system for controlling the heat transfer capability of a liquid cryogen freezer wherein the liquid cryogen is directly sprayed on the article to be cooled or frozen by sensing the temperature in the coldest recirculating gas zone of the tunnel and combining the resulting electrical signal with an electrical signal generated by a device for sensing the pressure of the liquid cryogen across the orifice and comparing these combined signals with a predetermined reference signal. A difference between the reference signal and the combined signals causes a controller to actuate a motorized valve to either increase or decrease the liquid cryogen flow so that the heat transfer capability of the tunnel is maintained at the desired level.

Therefore, it is the primary object of this invention to provide method of controlling the heat transfer capability in a liquid cryogenic freezer.

It is another object of this invention to control the performance of a cryogenic food freezer by measuring temperature of recirculating gas and rate of flow of cryogen.

It is still another object of this invention to provide method of controlling cryogenic freezer so that a minimum amount of cryogen is required to achieve the desired level of product refrigeration.

BRIEF DESCRIPTION OF THE DRAWING

FIG. 3b is the balance of the schematic diagram shown in FIG. 3a.

FIG. 3c is a schematic diagram of the piping in relation to the electrical controls for the automatic control system of FIGS. 3a and 3b.

DESCRIPTION OF THE REFERRED EMBODIMENT

Figure 1:
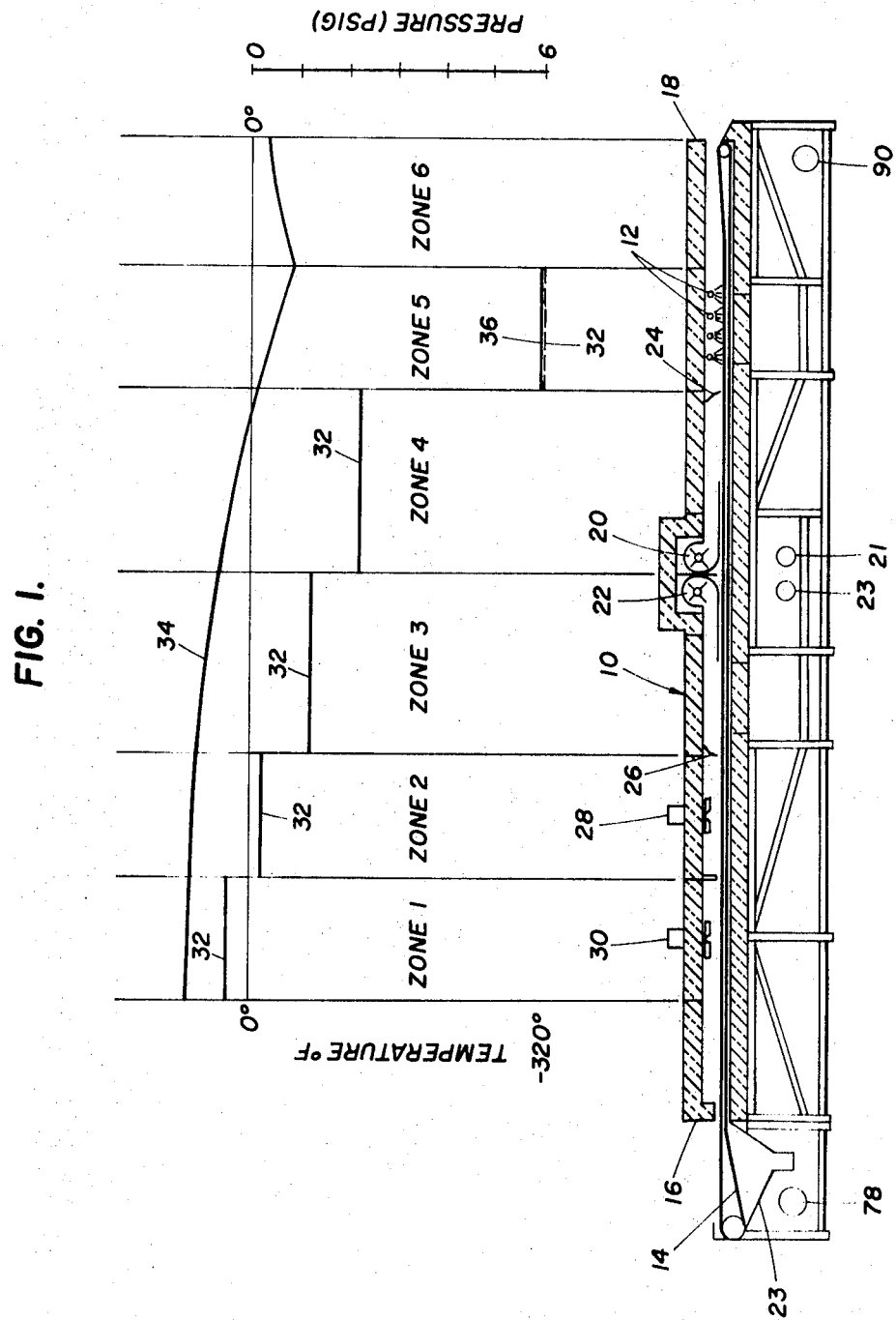
FIG. 1 is a schematic diagram depicting the temperature profile in relationship to the various zones of a tunnel type cryogenic freezer.

Referring to FIG. 1 there is a cross-sectional view of a cryogenic food-freezer 10 such as disclosed in U.S. Pat. 3,403,527. The freezer 10 has a plurality of liquid cryogen spray nozzles 12, a continuous product belt 14 driven by motor 90 for moving the product from the entry end 16 to the exit end 18 of the freezer. Blowers 20 and 22 driven by motors 21, 23 respectively are used to recirculate the cooling gas in their respective zones of the freezer. Control of the volume of gas in the blower recirculation paths is effected by dampers 24 and 26 respectively. Fans 28 and 30 are used to recirculate the gas in the entry end of the tunnel to aid in cooling the incoming product. Gaseous cryogen flowing out of the entry end 16 of the freezer 10 is collected by means of a collection chamber 23 which has disposed therein an exhaust fan (not shown) driven by motor 78.

The graph shown in FIG. 1 shows the temperature profile of food-freezer of the spray type with liquid nitrogen as the cryogen. The graph shows temperatures in the various zones No. 1 through 5 for a tunnel of this type. All zones except for No. 5 and 6 are gas recirculation zones. Zone 5 is the liquid cryogen spray zone and zone 6 is a post-cooling zone for preventing excessive air infiltration into the tunnel. Zone 6 aids in conditioning the frozen product but does not aid in determining the overall heat transfer characteristics of the tunnel. Zone 4 is generally considered the zone of coldest gas recirculation.

Also shown in FIG. 1 is a curve 34 of the temperature change at the surface of a product undergoing refrigeration. For example, the produce can be meat patties entering the tunnel at room temperature and exiting at a temperature below zero degrees Fahrenheit. The product is cooled to zero degrees through the first four zones of the freezer and thereafter taken well below zero degrees in the spray zone. In zone 6 some surface warming occurs as the temperature of the product tends toward equilibrium since the product is no longer under the direct nifluence of the liquid cryogen. Also shown in FIG. 1 is the measured pressure at the spray header shown as line 36 for the same operating conditions.

The area under curve 34 to the temperature line 32 in any given zone is a measure of the heat transfer for that zone. Such forced convection heat transfer is calculated by the formula:

$$q = UA \, (LMTD)$$

wherein:

$q$=heat transfer rate in B.t.u./hr.
$U$=coefficient of heat transfer $$\frac{B.T.U.}{Ft.^2 - °F. - Hr.}$$

$A$=surface area of the product being refrigerated ft.$^2$
$LMTD$=log mean temperature difference — ° F.

However, for zone 5 this is not a true measure since the temperature of this zone is essentially constant, i.e., the vaporization temperature of the liquid cryogen at atmospheric pressure. Therefore, the heat transfer in zone 5 is determined by the rate of flow of the cryogenic fluid and not the temperature. Of course variations in pressure will produce changes in the temperature profile of zones 1 through 4 of the tunnel. These temperature changes can be sensed and used to control the flow rate of cryogen. There is a considerable delay between the change in the cryogen flow and the time the effect of that change is sensed by the temperature sensing means which causes wide variations in tunnel performance as measured by the discharge product temperature and excessive cryogen consumption.

The heat transfer capability of zone 5 can be measured by measuring the pressure of the liquid cryogen across the spray orifice since it has been discovered that the variation in cryogen flow rate is essentially linear with pressure over the range of pressures employed in a tunnel type freezer such as shown in FIG. 1. The area under the curve 34 to the pressure line 36 then determines the heat transfer capability of this particular tunnel zone.

Therefore, measuring the area under curve 34 to the temperature and/or pressure curve will enable the heat transfer characteristics of the trunnel to be determined. Control of the tunnel heat transfer capability can then be achieved by assuring that the area under curve 34 remains essentially constant.

It is known that approximately 65% of the cooling of the tunnel occurs in zones 4 and 5. Therefore, it has been discovered that by monitoring the temperature in zone 4 and the flow rate of cryogen in zone 5 the heat transfer capability of the tunnel can be controlled.

Figure 2:
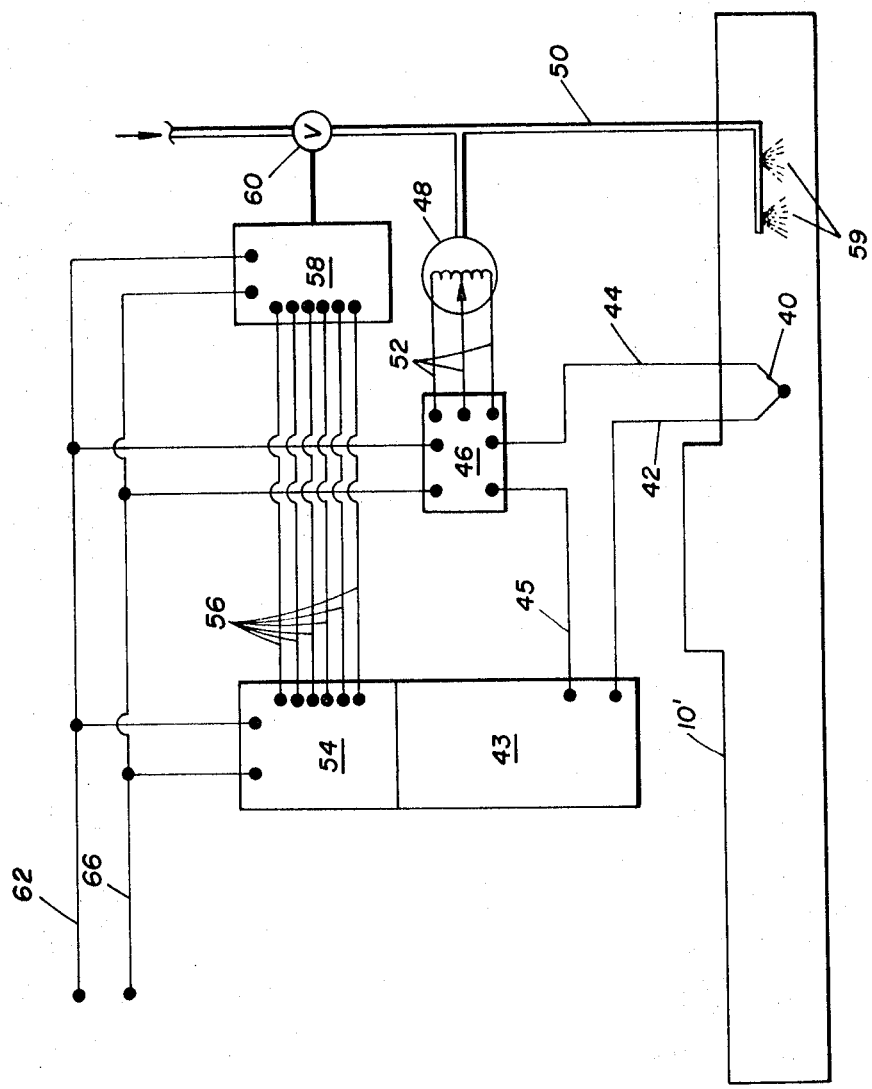
FIG. 2 is a schematic diagram of the basic control system according to the present invention.

This can be most readily achieved by the control system shown schematically in FIG. 2. Referring to FIG. 2 10' is a freezer tunnel similar to the one of FIG. 1. In zone 4 of tunnel 10' is a thermocouple 40 preferably of the constantan type. The constantan branch 42 of the thermocouple 40 is connected to the negative terminal of a millivolt controller 43 such as is commonly used for temperature control.

The copper branch 44 of the thermocouple is connected to the positive output terminal of a direct current millivolt power supply 46 and the other output terminal of the power supply 46 is connected via conduit 45 to the millivolt controller 43. Pressure transducer 48 is disposed in the cryogen supply conduit between the cryogen flow control valve 60 and the spray header 59. Pressure transducer 48 is of the conventional potentiometer type that receives electrical power from and indicates a pressure change to the power supply 46 by electrical leads 52. The electrical connections between the millivolt controller 43 and the thermocouple 40 in combination with the millivolt power supply 46 achieve the combined control input signal to the millivolt controller 43. The combined control input signal is based upon a direct measurement of recirculating gas temperature and cryogen spray pressure. Controller 43 takes the combined input signal and compares it with a predetermined set point or reference signal as will hereinafter be more fully explained. If a difference between the measured and reference signals is noted the controller 43 feeds a signal to a current to position converter 54. The current to position converter 54 is connected by leads 56 to a valve motor operator 58 which in turn positions valve 60 in liquid cryogen line 50 shown to increase or decrease the supply of liquid cryogen in conduit 50 depending upon the difference between the reference signal and combined measured signals. The millivolt power supply 46, current to position converter 54, and motorized valve 58,60 are powered from a 110 volt A.C. source (not shown) through conduits 62, 66 and suitable branch conduits.

With the control system described above it is possible to maintain the tunnel 10' at a uniform level of heat transfer capability because the flow of cryogen is rapidly controlled in response to changes in heat transfer characteristics in the major heat transfer sections of the tunnel 10'. If the liquid cryogen pressure changes a correction will be initiated before a temperature is indicated or measured by thermocouple 40 thereby eliminating a variation in the enthalpy of the product after cooling. Conversely if the temperature indicated by thermocouple 40 changes due to a change in the product being processed an appropriate change will be initiated in the spray zone to maintain the enthalpy of the product after cooling. For example, if the product reaching the thermocouple zone is higher in temperature the spray will be increased to assure uniform refrigeration and conversely if the incoming product is cooler when it reaches the thermocouple zone the cryogen flow will be reduced without sacrificing the uniformity of refrigeration of the product.

The reference signal put into controller 43 can be determined for any given tunnel for a given thermocouple resistivity and pressure transducer sensitivity. A plot of temperature variation against pressure variation for a given reference signal in the millivolt controller results in essentially a straight line relationship. Thus when the tunnel is empty, as when the product is being changed, it has been found that for a given cryogen flow rate the temperature in zone 4 will actually decrease approximately 50° F. As a result, a sudden increase in heat input due to the new product load is offset by the additional cooling of the product in zone 4.

The control system of FIG. 2 can be combined with a damper controller such as disclosed in U.S. Pat. 3,345,828 owned by the assignee of the present invention to control dampers 24 and 26 of the tunnel 10 in FIG. 1 to prevent excessive air infiltration or cryogen loss.

Figure 3A:
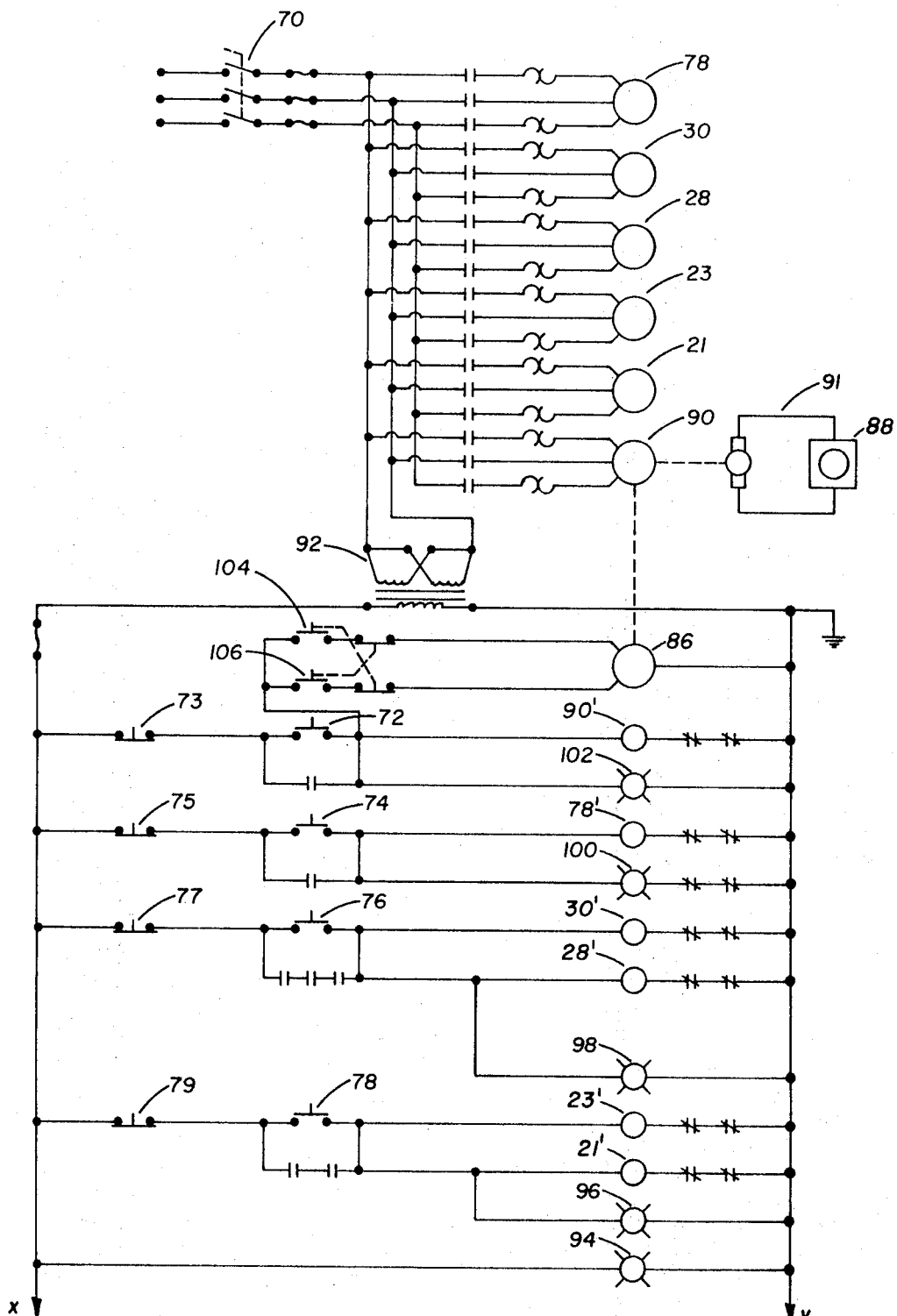
FIG. 3a is part of a schematic wiring diagram of an automatic control system for a cryogenic food freezer.
Figures 3B, 3C:
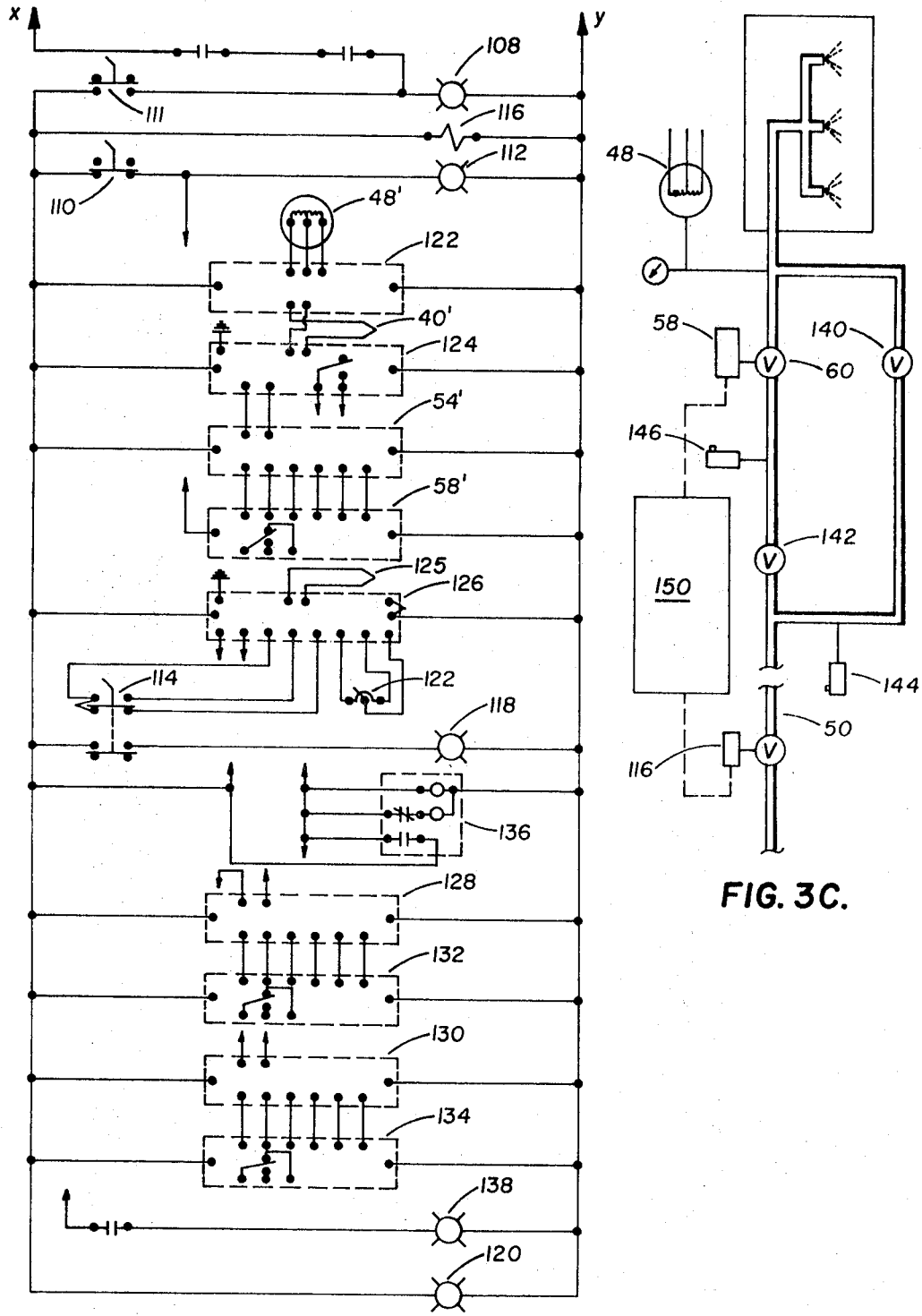

There is shown in FIG. 3a and 3b a diagram for a complete automatic freezer control that would enable a freezer to be brought to and maintained at operational level without the need for continual monitoring by an operator. Electrical connection of the parts of the diagram is completed by matching the respective $x$ and $y$ conduits.

As shown in FIGS. 3a and 3b all of the electrical power for the tunnel is fed through a master disconnect switch 70.

Push button contacts 72, 73 control motor starter 90' for motor 90 which drives the conveyor belt 14 of tunnel 10. Push button contacts 74, 75 control motor starter 78' for motor 78 which powers the exhaust fan of tunnel 10. Push button contacts 76, 77 control motor starters 30' and 28' for fan motors 30 and 28 respectively of tunnel 10, FIG. 1. Push button contacts 78, 79 control motor starters 23' and 21' for motors 23, 21 which power blowers 20, 22 respectively of tunnel 10. All motor starters are energized through a suitable control transformer 92. Pilot lights 94, 96, 98, 100 and 102 are included to indicate that, in the case of light 94 the power to the controller is on and the respective motors have been energized. Push button contacts 104 and 106 control remote speed controller 86 which in turn is connected to motor 90 to control the speed of the conveyor belt 14. The speed of conveyor belt 14 is indicated by remote speed indicator 88. Pilot light 108 is included and energized when motors 78 and 21 are operating to indicate that gaseous cryogen will be properly exhausted and also circulating in zone 4 of the tunnel. Selector switch 110 controls the liquid nitrogen flow by putting the flow control valve 60 (FIG. 2) included in the cryogen flow line either under manual or automatic control with automatic control being indicated by pilot light 112. On-off switch 111 initiates the flow of liquid cryogen, by opening the valve 116, open position of valve 116 being indicated by pilot light 120.

Selector switch 114 puts the dampers 24, 26 of tunnel 10 under either automatic or manual control. When the damper control 114 and liquid cryogen control 110 are energized in the automatic mode and switch 111 moved to the on position solenoid 116 opens the master liquid cryogen supply valve disposed in the cryogen supply conduit between the source of cryogen (e.g. a tank) and the flow control valve 60, cryogen flow valve 60 is thus initiated. Under automatic operation pilot light 112 indicates the cryogen flow is being controlled automatically and pilot light 118 indicates the dampers are being controlled automatically.

A set-point on the millivolt controller 124 is selected to produce a predetermined reference signal as described in connection with FIG. 2. Temperature in zone 4 is measured by thermocouple 40' and liquid cryogen pressure by pressure transducer 48'. These signals, which are produced by the thermocouple 40' and transducer power supply 122 respectively, are combined and fed to the controller 124 which produces a signal to be fed to current to position converter 54' which in turn energizes the valve motor operator 58' to either increase or decrease the liquid cryogen flow.

When the signal from thermocouple 40' and pressure transducer 48' are above the set point on controller 124 the cryogen flow control valve 60 is opened by valve motor operator 58'. Thus when the switches 110 and 114 are in the automatic mode and switch 111 moved to the on position the combined signal being greater than the set point on controller 124 will cause the valve motor operator 58' to open valve 60 to begin cool down of the tunnel. When the controller 124 receives the combined signal from transducer 48' and thermocouple 40' equal to the set point, a low alarm contact included in controller 124 energizes timer circuit 136 which runs for three to five minutes and then turns on pilot light 138 which tells the operator the tunnel is ready to receive product and will achieve the desired level of product refrigeration.

Thermocouple 125 is mounted at the exit end of zone 6 as described in U.S. Pat. 3,345,828 to indicate the gaseous cryogen level. The thermocouple 125 sends a signal to the damper controller 126. Damper controller 126 in turn sends a signal to current to position converters 128, 130 which control damper motor operators 132, 134 respectively to position dampers 24, 26 (FIG. 1) so that excessive air infiltration or cryogen loss is prevented.

Shown in FIG. 3c is the schematic diagram for the piping controls on the liquid cryogen conduit 50: Solenoid valve 116 is the master on-off flow valve for liquid cryogen. Flow control valve 60 is automatically controlled by valve motor operator 58 which in turn is electrically connected to the master control unit 150. Hand valves 140 and 142 are included to enable the cryogen flow to the freezer to be controlled manually or automatically by either using or by-passing valve 60. Included in the proper locations are pressure relief valves 144, 146 to prevent over pressurization of the liquid cryogen conduit.

To operate the freezer using the control of FIGS. 3a and 3b the following steps are required. Switch 70 is closed sending power to the control circuit; power on being indicated by light 94. Hand valve 140 is closed and hand valve 142 is opened. Push button contacts 72, 74, 76, and 78 are depressed energizing motors 90, 78, 30, 28, 23, and 21 and pilot lights 102, 100, 98, and 96 for the respective motor circuits. When motor 78 for the exhaust fan and motor 23 for blower 22 are energized pilot light 108 is illuminated indicating a safe condition for liquid cryogen flow. The conveyor belt speed can be adjusted by pressing switch 104 to increase speed or switch 106 to decrease the speed of rotation of motor 90 with the speed being shown by remote indicator 88. Switch 110 is moved to the automatic liquid cryogen flow control position, switch 114 is moved to the automatic damper control position and switch 111 is moved to the on position to start the flow of cryogen by energizing solenoid supply valve 116 to the open position which is indicated by pilot light 120. Pilot light 118 indicates damper control is under automatic operation. Since the set point on millivolt controller 124 was predetermined, the valve 60 begins to open and the tunnel begins to receive cryogen in the spray zone. When the combined signal from the thermocouple 40' and transducer 48' reach the set point on controller 122 the timer 136 is activated for three to five minutes at which time the tunnel has reached operating condition. After the time sequence has elapsed, load light 138 is energized and the operator can start putting product through the tunnel.

To shut-down operation of the tunnel, switch 111 is moved to the off position de-energizing valve 116 and stopping cryogen flow. Push button contacts 75, 77, and 79 are depressed to stop the respective fan and blower motors. Belt 14 is kept running for cleaning and then stopped by depressing push button contact 73. Finally all power is disconnected by opening switch 70.

In order to operate the freezer manually switches 110 and 114 are put in the manual mode. Dampers are set by potentiometer 122 and switch 111 is put in the on position. When thermocouples with temperature indicators (not shown) located adjacent to thermocouples 40' and 125 respectively indicate the proper temperature, the freezer is ready to be loaded. Shut down is as described for automatic operation.

It is apparent from the foregoing disclosure that if the number of gas recirculation zones is increased it may be necessary to measure the temperature in additional gas zones in order to get an effective temperature signal. This can be achieved by connecting in series the additional thermocouples to obtain the required signal.

The various electrical components of the control device are readily available and known to those skilled in the art.

Having thus described my invention the following is desired to be secured by Letters Patent of the United States.

I claim:

1. In a cryogenic cooling device of the type wherein the product to be cooled is moved through a zone of gas recirculation and then a zone where a cryogen is sprayed directly onto the product being cooled, the improvement which comprises:
   means for sensing the temperature in the gas recirculation zone, said temperature sensing means generating an electrical signal;
   means for sensing the pressure across the cryogen spray device, said pressure sensing means generating an electrical signal;
   means to combine the temperature and pressure signals and compare them to a reference signal;
   means for increasing or decreasing the supply of cryogen at the spray zone, said means responsive to and controlled by a difference in signal between the reference signal and the sum of the temperature and pressure signals;
   whereby the heat transfer capability of the cryogenic cooling device can be controlled.

2. A device according to claim 1 wherein the temperature and pressure sensing means are a thermocouple and pressure sensitive transducer respectively operatively connected to a millivolt controller which sends a control signal to a motorized valve disposed in the cryogen supply conduit.

3. Apparatus for controlling the heat transfer capability of a cryogenic food freezer of the type having a plurality of gas recirculation zones of varying temperature and at least one zone containing means for spraying liquid cryogen on the food to be frozen comprising in combination;
  means for sensing the temperature in the coldest gas recirculation zone of the freezer, said temperature sensing means generating an electrical signal;
  means for sensing the pressure at the cryogen spray zone, said pressure sensing means generating an electrical signal;
  means for electrically combining said temperature and pressure signals;
  means for comparing said combined signals to a reference signal;
  means for varying the flow of cryogen in response to a difference between the combined signal and the reference signal so that the heat transfer capability of the freezer is maintained at a predetermined level.

4. A device according to claim 3 wherein the temperature sensing means comprises a copper-constantan thermocouple.

5. A device according to claim 3 wherein the pressure sensing means comprises a pressure sensitive transducer with a working range of 0 to 30 p.s.i.g.

6. A device according to claim 3 wherein the electrical signal adding and comparing means comprises a millivolt electrical controller and the flow varying means comprises a motorized valve responsive to said millivolt controller.

7. A method of controlling the heat transfer capability of a multiple gas recirculation zone spray-type tunnel food freezer employing cryogenic liquids comprising the steps of:
  measuring the temperature in at least the coldest gas recirculation zone of the tunnel and translating said temperature into an electrical signal;
  measuring the pressure across the cryogenic liquid spray device and translating said pressure into an electrical signal;
  combining said electrical signals and comparing them against a predetermined operating control signal;
  changing the rate of flow of the cryogenic fluid in accord with a difference between the combined signal and the reference signal, so that the rate of heat transfer of the tunnel is controlled.

8. An electrical control system for a cryogenic food freezer of the tunnel type comprising in combination:
  means for supplying electrical power individually to a plurality of motors that drive gas circulation devices;
  means for supplying power to a motor for driving a product conveyor in the tunnel;
  means for varying the rate of travel of the conveyor motor;
  means to indicate that at least two selected motors are energized so that cryogen can be introduced to the tunnel;
  means for introducing cryogen into the supply conduit to the tunnel with means for indicating cryogen flow;
  means for controlling air infiltration to the tunnel;
  means for introducing cryogen into the tunnel with indicator showing cryogen flow to the tunnel;
  means for increasing or decreasing cryogen flow in response to a combined temperature and pressure signal and comparing this signal to a reference signal;
  means for continuing tunnel cooling for a predetermined time after the combined signal and reference signal are the same;
  and indicator means energized at the end of the predetermined time period to indicate the tunnel is ready to receive product.

References Cited

UNITED STATES PATENTS

| 3,222,882 | 12/1965 | Sutton, Jr., et al. | 62—209 X |
| 3,324,674 | 6/1967 | Finnegan et al. | 62—204 |
| 3,499,267 | 3/1970 | Ruff et al. | 62—209 X |
| 3,508,605 | 4/1970 | Kusuda et al. | 62—209 X |

MEYER PERLIN, Primary Examiner

R. C. CAPOSSELA, Assistant Examiner

U.S. Cl. X.R.

62—203, 204, 208, 209; 236—78